United States Patent
Coates et al.

(10) Patent No.: US 8,767,707 B2
(45) Date of Patent: Jul. 1, 2014

(54) MONITORING A MOBILE DATA SERVICE ASSOCIATED WITH A MAILBOX

(75) Inventors: Douglas James Coates, Kitchener (CA); Maithili Mavinkurve, Markham, CA (US); Lee Alexander Cocking, Waterloo (CA)

(73) Assignee: BlackBerry Limited, Waterloo (CA)

( * ) Notice: Subject to any disclaimer, the term of this patent is extended or adjusted under 35 U.S.C. 154(b) by 511 days.

(21) Appl. No.: 12/766,013

(22) Filed: Apr. 23, 2010

(65) Prior Publication Data
US 2011/0261701 A1    Oct. 27, 2011

(51) Int. Cl.
*H04J 3/06* (2006.01)
*G06F 15/173* (2006.01)

(52) U.S. Cl.
USPC ............ 370/350; 370/503; 709/206; 709/224

(58) Field of Classification Search
CPC .... G06Q 10/107; H04L 12/585; H04L 12/58; H04L 29/06; H04J 3/0638; H04J 3/0685; H04J 3/0632; H04J 3/0664; H04W 56/00; H04W 56/001; H04W 56/0045
USPC .......... 370/324, 350, 503, 507; 709/219–230, 709/206
See application file for complete search history.

(56) References Cited

U.S. PATENT DOCUMENTS

| | | | |
|---|---|---|---|
| 5,884,284 A | 3/1999 | Peters et al. | |
| 6,055,493 A | 4/2000 | Ries et al. | |
| 6,192,034 B1 | 2/2001 | Hsieh et al. | |
| 6,253,243 B1 | 6/2001 | Spencer | |
| 6,557,036 B1 | 4/2003 | Kavacheri et al. | |
| 6,874,106 B2 | 3/2005 | Suzuyama et al. | |
| 6,879,995 B1 | 4/2005 | Chinta et al. | |
| 6,985,901 B1 | 1/2006 | Sachse et al. | |
| 7,069,184 B1 | 6/2006 | Barger et al. | |
| 7,246,159 B2 | 7/2007 | Aggarwal | |
| 7,490,073 B1 | 2/2009 | Qureshi et al. | |
| 8,364,769 B2 * | 1/2013 | McCarthy et al. ............ 709/206 |
| 2004/0044753 A1 | 3/2004 | Toyoshima et al. | |
| 2004/0236999 A1 * | 11/2004 | Bezuidenhout .................. 714/38 |
| 2006/0053021 A1 | 3/2006 | Bystedt | |

(Continued)

FOREIGN PATENT DOCUMENTS

WO    0213018 A2    2/2002
WO    2007123470 A2    11/2007

OTHER PUBLICATIONS

Fetchmail-manual, Apr. 2, 2003.*

(Continued)

*Primary Examiner* — Habte Mered

(57) ABSTRACT

Methods and apparatus enable monitoring a mobile data service, and in particular monitoring an operational status of a relationship between a mobile gateway account on a mobile gateway and a mailbox on a messaging server. The operational status may be based on an initialization state of the mobile gateway account on a mobile gateway and a mailbox status of an associated mailbox on a messaging server. In one embodiment, the mailbox status may be determined based on mailbox errors indicative that a mobile gateway is unable to access the mailbox on the messaging server. In one embodiment a mobile gateway detects mailbox errors based on mailbox protocol error messages and sends an error notification to a monitoring system. Also provided are error notifications for facilitating, in a monitoring system, the correlation of mailbox errors with mobile gateway accounts.

19 Claims, 9 Drawing Sheets

(56) References Cited

U.S. PATENT DOCUMENTS

| | | | |
|---|---|---|---|
| 2006/0168083 A1 | 7/2006 | Lee et al. | |
| 2007/0093243 A1 | 4/2007 | Kapadekar et al. | |
| 2007/0100978 A1* | 5/2007 | Levi et al. | 709/223 |
| 2008/0256204 A1* | 10/2008 | Kamat et al. | 709/206 |
| 2008/0282078 A1* | 11/2008 | Okada et al. | 713/150 |
| 2009/0254622 A1* | 10/2009 | Okada | 709/206 |
| 2009/0254748 A1* | 10/2009 | Mochizuki | 713/168 |
| 2009/0259726 A1* | 10/2009 | Jordan, Jr. | 709/206 |
| 2009/0276700 A1 | 11/2009 | Anderson et al. | |
| 2010/0250681 A1* | 9/2010 | Van Wely | 709/206 |
| 2010/0293278 A1* | 11/2010 | Boyd et al. | 709/226 |

OTHER PUBLICATIONS

European Search Report issued Jul. 30, 2010 in respect of corresponding EP Application No. 10163614.0.
Retrieved from Internet: Free BSD Howtos: "Network: Fetchmail", http://freebsdhowtos.com/32.html.
Simongie et al.: "Fetchmail", Contribs.org, Retrieved from Internet: http://forums.contribs.org/index.php/topic,44653.0.html.
Retrieved from Internet: "EMail Delivery and Windows Server Problem Notifications", http://www.bearmtnsw.com/email%20alarming%20paging%20snmp.html.
BlackBerry Release Notes, BlackBerry Enterprise Server for IBM Lotus Domino Version 4.1 Service Pack2.
ReSoft International LLC, "Topper Email Monitor for Email, Servers, Heartbeat, BlackBerry& IP Monitoring, Service Level Reporting—With No Local Agents", Retrieved from Internet: http://www.re-soft.com/product/topper.htm.
Cisco Systems, "Understanding Simple Network Management Protocol (SNMP) Traps", Retrieved from Internet: http://www.cisco.com/en/US/tech/tk648/tk362/technologies_tech_note09186a0080094aa5.shtml [Apr. 14, 2010 2:01:40 PM].
Hewlett-Packard Development Company, LP, HP SiteScope Software Data Sheet, Aug. 1, 2008.
3D2F.Com Software Directory, "ExInsight for Microsoft Exchange", Retrieved from Internet: http://3d2f.com/programs/63-022-exinsight-for-microsoft-exchange-download.shtml, Jan. 7, 2010.
Microsoft Corporation, "Microsoft TechNet: Microsoft Exchange Server User Monitor", Retrieved from Internet: http://technet.microsoft.com/en-us/library/bb508855(EXCHG.65,printer).aspx, Apr. 12, 2010.
Fenestrae, Fenestrae White Paper—Mobile Synchronization for The Widest Range of Devices, "Fenestrae Mobile Data Server Sync Edition", 2005.
Hewlett-Packard Development Company, LP, "Going beyond simple infrastructure monitoring with HP SiteScope" White Paper, Apr. 2008.
Zenprise, Inc., "Zenprise MobileManager: Service Manager Module-Detecting Infrastructure Problems", www.zenprise.com/products, 2008.
Zenprise, Inc., "Zenprise for BlackBerry: Proactively Troubleshoot and Resolve End-User and Infrastructure Problems", www.zenprise.com/blackberry.
Zenprise, Inc., "Zenprise Service Manager: Increase Performance At Every Point of Mobility", www.zenprise.com, 2009.
Zenprise, Inc., "Technical Product Brief, Automated Email Management", Zenprise Whitepaper, www.zenprise.com/products, 2005.

* cited by examiner

MONITORING A MOBILE DATA SERVICE ASSOCIATED WITH A MAILBOX

FIELD OF TECHNOLOGY

This disclosure relates generally to the monitoring of a mobile data service, and specifically to monitoring of a relationship between a mobile gateway account on a mobile gateway and a communications service mailbox associated with the mobile gateway account.

BACKGROUND

Mobile devices (smart phones, portable digital assistants, portable gaming devices, laptops, cell phones, etc) may exchange messages or other content via a mobile data service. A mobile data service may be a messaging service, a mobile mail service, messaging subscription, or any service that creates a relationship between a mailbox and a mobile device. For example, a mobile data service may be used to send, receive, synchronize, or otherwise communicate emails between a mobile device and a mailbox. It will be understood that a mailbox may be a traditional email account, mail account, messaging account, social media account, instant messaging account, or any account (also referred to as a user account, subscription, profile, or user identity) that is associated with a bundle of communications directed to or from the account. For example, a mailbox may provide access to a group of email messages. In another example, a mailbox may be a storage for communications directed to or from an instant messaging account (e.g. an account for IM, ICQ, IRC, or other types of instant messaging platforms). A messaging server may provide coordination of communications in a mailbox for a variety of clients including a client application on a personal computer, a web browser, a mobile gateway or mobile device. A messaging server is not limited to managing data in the form of traditional messages, but may manage other content items different from traditional messages.

FIG. 1 is an illustration of an example system 100 which includes a mobile data service. In example system 100, a first mobile device 110 is utilizing a mobile data service 140 to send and receive messages. An implementation of a mobile data service may include a mobile gateway 150 configured to provide, communicate, exchange or synchronize messaging content, including but not limited to email messages, to, from, or between one or more mobile devices (e.g., 110, 111) and one or more mailboxes (e.g., 130, 131) on a messaging server 160. Each messaging content item is associated with at least one mailbox, e.g., 130, 131, 132 on messaging server 160. In an implementation of a mobile gateway 150, a first mobile device 110 is associated with a mobile gateway account, such as first gateway account 120 configured on the mobile gateway 150. For example, the mobile gateway account may comprise information about the mobile device, the user of the mobile device, or other configuration information for providing mobile data services to a mobile device. Other terms for mobile gateway account might include, without limitation: gateway account, mobile account, mobile subscription, gateway profile, gateway user, or other terms to refer to a configuration of account parameters associated with a client of a mobile gateway. The concept of an account in this disclosure may be unrelated to financial services. It will be understood that a "mobile gateway account" or "gateway account" in this disclosure may refer to a group of related resources, including configuration settings, other storage, software, services, and the like, that are managed or organized to implement or facilitate a mobile data service on a mobile gateway. Furthermore, a gateway account may be associated or configured with a unique gateway account identifier which may be used by the mobile gateway to identify the gateway account. A mobile gateway 150 may be configured to utilize gateway account settings (such as those that may be associated with first gateway account 120) to provide a first mobile device 110 with access to a first mailbox 130 on a messaging server 160.

A mobile gateway may store settings or configurations parameters associated with a gateway account in a gateway account database, or other storage accessible to the mobile gateway. For example, a mobile gateway account on a mobile gateway may comprise one or more configuration parameters that identify a mailbox associated with the mobile gateway account. Often the configuration of the mobile gateway account is managed at the mobile gateway, while configuration of the mailbox is managed at a separate system. For example, the mailbox may be associated with a separate account database or mailbox parameters on the messaging server. Consequently, when an error prevents a mobile device from accessing the mailbox via a mobile gateway, resolving the error may entail troubleshooting of the mobile data service.

Troubleshooting a problem with a mobile data service may be difficult or time consuming. For example, a troubleshooting process might include identifying a mobile gateway account associated with a mobile device and then checking a mobile gateway having the mobile gateway account for an indication of an error condition. Troubleshooting an error condition at the mobile gateway may involve accessing the mobile gateway to obtain a log file or other data, parsing the log file to identify an entry (if any) related to the mobile gateway account and interpreting the entry for clues as to the cause of the error. Troubleshooting a problem with a mobile data service using conventional troubleshooting processes is especially difficult when there are multiple mobile gateways and/or multiple mobile gateway accounts involved.

Accordingly, monitoring of relationships between mobile gateway accounts and mailboxes would assist in the troubleshooting and management of mobile data services.

BRIEF DESCRIPTION OF THE DRAWINGS

The following detailed description is made with respect to example embodiments and in conjunction with the accompanying drawings by way of illustration. In the drawings, like numerals describe substantially similar components throughout the several views.

DETAILED DESCRIPTION

Provided are method and apparatus for monitoring an operational status of a relationship between a mobile gateway account on a mobile gateway and a mailbox on a messaging server. The operational status associated with a mobile data service may be related to at least one of: an initialization state of the mobile gateway account on the mobile gateway; and the mailbox status. In one embodiment, the mailbox status may be determined based on mailbox errors detected by a mobile gateway, wherein presence of a mailbox error indicates an inability to access the mailbox. For example, the operational status of the mobile data service may be responsive to a mailbox error detected by the mobile gateway based on a mailbox protocol error message.

A mailbox error may be communicated to and received by a monitoring system in an error notification. The error notification may include other information, such as a mobile gateway account identifier or a mailbox identifier, used by the monitoring system to associate the mailbox error with a mobile gateway account. Monitoring of a mobile data service may be improved by presenting an initialization status of a mobile gateway account as well as the mailbox error.

In an embodiment, a monitoring system may utilize error information associated with mailbox errors, and an account list identifying mobile gateway accounts configured on a mobile gateway, to present a list of inoperative mobile gateway accounts (e.g. having an operational status indicating inoperability) and associated mailbox errors. A relationship between mailbox status and mobile gateway account status may be coordinated in the monitoring server to assist in the monitoring of mobile gateway accounts. For example, the monitoring system may combine mailbox status and mobile gateway account status to provide an operational status associated with the mobile gateway account. In an example system with a large number of mobile gateway accounts, the operational status of the mobile gateway accounts may be monitored based on received error notifications from a mobile gateway upon encountering mailbox protocol errors associated with a specific mailbox in relation to a specific mobile gateway account.

Figure 1:
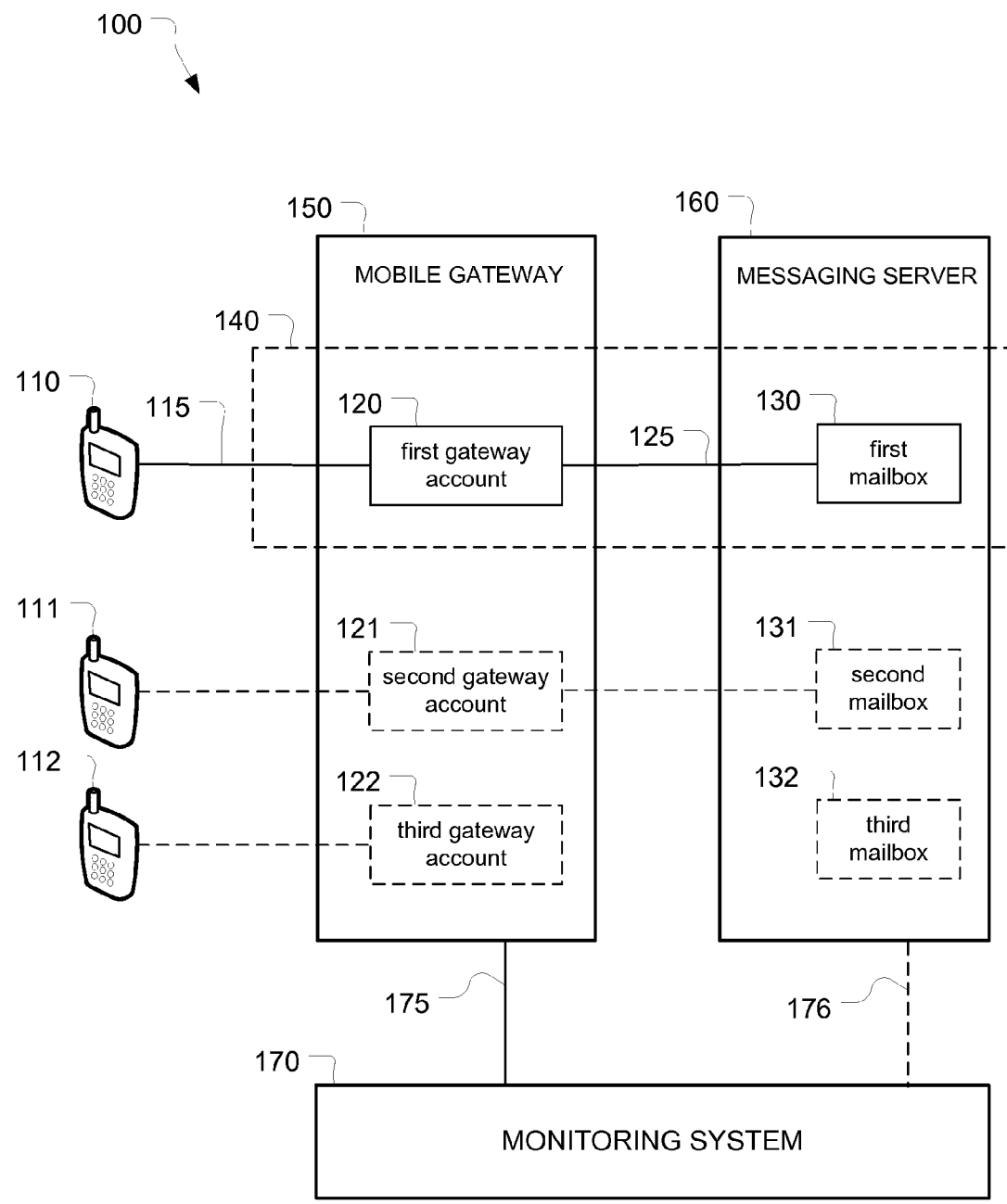
FIG. 1 is a block diagram of an example system associated with a mobile data service as described in this disclosure.

Returning to FIG. 1, an example system 100 may comprise mobile gateway 150, messaging server 160, and monitoring system 170. In this disclosure, a mobile gateway is any machine, computing device, agent, application, or combination thereof that enables a mobile device to access a mailbox on a messaging server. Messaging server 160 may be realized as an email server, mailbox server, mail server, instant messaging platform, social networking application, or generally arrangement of at least one of a server computer/device and server software executing thereon which provides a service related to coordination of communications for at least one client. Messaging server 160 may be implemented as any suitable messaging server capable of providing, sending, receiving, or otherwise communicating messages or other content. For example, messaging server 160 may be implemented as a mail server, such as Microsoft Exchange, a Lotus Notes server, or any other message transport agent such as Sendmail, qmail, Exim, postfix, any of which may implement any suitable messaging protocols and interfaces such as those described in this document and the like. Mobile gateway 150 provides an interface between one or more mobile devices and the messaging server 160. In FIG. 1, first mobile device 110 has a mobile device association (represented by line 115) with a first gateway account 120 configured on the mobile gateway 150. Additionally, the first gateway account 120 is configured on mobile gateway 150 such that there is a mailbox association (represented by line 125) between the first gateway account 120 and a first mailbox 130 on messaging server 160. For example, the first gateway account 120 may comprise configuration settings that establish a relationship between the first mobile device 110, the first gateway account 120 on the mobile gateway 150, and a first mailbox 130 on the messaging server 160.

Mobile device association 115 and mailbox association 125 represent logical relationships in FIG. 1. As will be understood, any suitable communication link (such as those described in FIGS. 2 and 3) may be used by the mobile gateway 150 to communicate with the first mobile device 110 and first mailbox 130 in furtherance of the logical relationships 115, 125. For example, a communication link between the mobile gateway 150 and the messaging server 160 may comprise a network or combination of networks that allow the mobile gateway 150 to access the messaging server 160. Additionally, a communication link may comprise a messaging agent, proxy, gateway, or other process used by the mobile gateway 150 to access the messaging server 160. According to the settings of a first gateway account 120, the mobile gateway 150 may interact with the first mailbox 130 on the messaging server 160 via the communication link. The mobile gateway 150 may access the first mailbox 130 using a variety of mailbox protocols, such as those known to a person of skill in the art. For example, the mailbox protocol may be a messaging application programming interface (MAPI), Internet Message Access Protocol (IMAP), Post Office Protocol (POP), Simple Mail Transfer Protocol (SMTP), Outlook Web Access (OWA), HyperText Transfer Protocol (HTTP), Secure HyperText Transfer Protocol (HTTPS), eXtensible Markup Language (XML), Exchange Web Services (EWS), Exchange ActiveSync, Simple Object Access Protocol (SOAP) or any other protocol that may be used by the mobile gateway to access an individual mailbox on a messaging server.

Among several functions of mobile gateway 150, when an email message arrives for first mailbox 130 at messaging server 160, mobile gateway 150 may initiate a process to transmit, exchange, synchronize, or otherwise communicate the email message to first mobile device 110. Mobile gateway 150 may provide synchronization between the first mailbox 130 and the first mobile device 110, specifically a counterpart first mobile mailbox (not shown) on the first mobile device 110. Synchronization may performed periodically at scheduled intervals, performed as a result of the mobile device or messaging server receiving a request to initiate synchronization, or may occur as the result of a change in the mailbox (such as a new message or an account update).

When synchronization is enabled and successfully completed by the mobile gateway 150, first gateway account 120 may be associated with a success condition. Alternatively, when synchronization is disabled, failed, or otherwise incapable of completion, the first gateway account 120 may be associated with an error condition on the mobile gateway 150. The success condition or error condition may be referred to as an initialization state of the first gateway account 120 on the mobile gateway 150. In some implementations, the initialization state of a mobile gateway account may be stored in a log file, saved in storage accessible by the mobile gateway, or transmitted to a monitoring system, such as monitoring system 170. Other terms may refer to an initialization state of an mobile gateway account, such as mobile gateway account status, gateway account state, activation status, or other similar terms associated with the gateway account success or failure to provide mobile data service between a mobile device and a mailbox. An initialization state on the mobile gateway 150 may be altered based on any change in the success or failure condition. For example, the initialization state may be changed after a subsequent synchronization process to indicate a success or failure of the subsequent synchronization.

Monitoring system 170 may be in communication (such as via monitoring link 175) with the mobile gateway 150. The monitoring system 170 may be configured to monitor various aspects of the mobile gateway 150. Additionally, the monitoring system 170 may have a second monitoring link 176 such that the monitoring system 170 may monitor various aspects of messaging server 160. Various aspects monitored by the monitoring system 170 may include network connectivity/accessibility, the executing status of an application, or utilization of one or more processors of the mobile gateway 150 or messaging server 160. It will be understood that aspects of monitoring system 170 may include commercial, proprietary, or customized monitoring applications running on a server computer/device. Monitoring system 170 may comprise a collection of applications configured to implement various aspects of this disclosure. Monitoring system 170 may have one or more processors, and may be distributed among one or more machines.

Messaging server 160, mobile gateway 150, and monitoring system 170 may be realized using one or more suitable programmable computer systems running a commercially available operating system. For example, these items may be realized using commercial server computers having Intel IA-32-based processors and running an operating system in the Microsoft Windows Server family. Other computers and operating systems could also be used. Although some of elements 160, 150, and 170 are depicted as distinct elements and may be realized as such (i.e., using separate server computers), these elements may be refactored or virtualized as necessary to meet expected load. Thus, these elements could also be realized as different processes running on the same computer or on several computers.

Having described an example system 100 in which embodiments of this disclosure may be used, an example scenario detailing an embodiment of this disclosure will be described. This example scenario, and other examples in this disclosure, are provided for illustrative purposes and are not intended to limit the scope of the present disclosure.

In one example scenario, an error occurs that prevents synchronization of the first mailbox 130 with the first mobile device 110. Specifically, the mobile gateway 150 encounters an error when accessing the first mailbox 130 on the messaging server 160. Examples of errors associated with accessing a mailbox may include, without limitation: mailbox unavailable, mailbox disabled, mailbox corrupt, mailbox authentication failure, etc. In this disclosure "errors associated with a mailbox" may also be referred to as "mailbox errors" or "messaging account errors" and denotes any error specific to a particular mailbox on the messaging server. Other errors, such as server-wide problems, general problems with a messaging process on a messaging server, or general application errors may also cause connectivity issues to the messaging server, but are not necessarily associated with a particular mailbox on the messaging server.

Mobile gateway 150 may detect mailbox errors when attempting to access the first mailbox 130. For example, a MAPI error message received at the mobile gateway 150 may include an error code that indicates a mailbox error associated with first mailbox 130 on the messaging server 160. Upon detecting the mailbox error associated with the first mailbox 130, the mobile gateway 150 may send an error notification to monitoring system 170. The error notification may be a message indicative of an error associated with the first mailbox 130. In one embodiment, the error notification comprises an error indicator and an identification of the first gateway account 120 (also referred to as first gateway account identifier). Because the mobile gateway 150 detects the error based on accessing the first mailbox 130 and the first mailbox 130 is associated with the first gateway account 120, the mobile gateway 150 may include the first gateway account identifier in the error notification to the monitoring system 170. Alternatively, the error notification may be sent from the messaging server 160 to the monitoring system 170 upon detection, by the messaging server 160, of a mailbox error. For example, the error notification from the messaging server may include a mailbox identifier or some other identifying information that may be used by the monitoring system to relate the mailbox error to a mobile gateway account.

In the example scenario, the monitoring system 170 is configured to monitor one or more aspects of the status of the first gateway account 120 on the mobile gateway 150. For example, the monitoring system 170 may monitor an operational status of a relationship between the first gateway account 120 on the mobile gateway 150 and the first mailbox 130 on the messaging server 160. Monitoring the operational status of the relationship may comprise maintaining a record of the operational status (e.g. in memory, storage, media, or other apparatus for storing information). The record may be implemented as a database record in a database, or may be unrelated to a database record. In one implementation the record of the operational status comprises data in a memory or other storage accessible to the monitoring system. The monitoring system 170 may receive error notifications associated with errors encountered by a mobile gateway 150 when accessing particular mailboxes on a messaging server 160. For example, the monitoring system 170 may receive the error notification from the mobile gateway 150, based on the first mailbox error detected at mobile gateway 150. Based on the received error notification, the monitoring system 170 may update a record of the operational status of the relationship between the first gateway account 120 and the first mailbox 130 to include error information (such as an error indication or error text) about the first mailbox error. For example, the monitoring system 170 may update a record of the operational status in a storage record associated with the first gateway account 120. An administrator accessing the monitoring system 170 may obtain from the monitoring system 170, an identification of the first gateway account 120 and error information concerning the first mailbox 130. As described in this disclosure, an operational status associated with a mobile gateway account may include an operational status of a relationship between the mobile gateway account and a related mailbox. For example, the operational status associated with the first gateway account 120 may comprise a combination of (1) an initialization state of the first gateway account 120 on the mobile gateway 150 and (2) the mailbox status associated with the first mailbox 130.

In one embodiment, the monitoring system 170 may process the error notification. Processing the error notification may comprise one or more of: translating the error indication, storing the error indication in a storage, matching a mobile gateway account identifier in the error notification to an account list identifying mobile gateway accounts on a mobile gateway, or transmitting an alert message to an administrator indicating an operational status of the relationship between the mobile gateway account and an associated mailbox. For example the alert message may include an identifier of the mobile gateway account and the mailbox error encountered. In some implementations, the monitoring system 170 may query the mobile gateway 150 for more information about the mobile gateway account in response to receiving the error notification. For example, the monitoring system 170 query a management application programming interface of the mobile gateway to obtain additional error information concerning the mailbox error.

As a continuation of the example scenario, mobile gateway 150 may periodically attempt to access first mailbox 130 after having encountered a first mailbox error. The mobile gateway 150 and/or the monitoring system 170 may maintain an initialization state of the first gateway account 120 indicating an error condition. If the mobile gateway 150 subsequently is successful connecting to the first mailbox 130 (e.g. not encountering the mailbox error previously detected, or otherwise successfully completing access of mailbox items), the mobile gateway 150 may send a subsequent notification to the monitoring system 170 to indicate that the first mailbox error has abated. The monitoring system 170 may receive the subsequent notification and update the record of the operational status associated with the first gateway account 120.

In some implementations, a mobile gateway 150 may provide mobile data services for a plurality of mobile devices. In the example system 100 of FIG. 1, mobile gateway 150 provides mobile data service for first mobile device 110, second mobile device 111, and third mobile device 112. Similar to the relationship between first mobile device 110, first gateway account 120 and first mailbox 130, there may be a relationship between second mobile device 111, second gateway account 121, and second mailbox 131. The mobile gateway 150 may have additional mobile gateway accounts associated with other mobile devices. The mobile gateway 150 may have other mobile gateway accounts, such as third gateway account 122, which are configured for other messaging services (not shown), provided to a mobile device, such as third mobile device 112. Similarly, the messaging server 160 may also have other mailboxes configured on the messaging server 160 that are not associated with a mobile gateway account on the mobile gateway 150, such as third mailbox 132.

The monitoring system 170 may be configured such that it monitors mobile data services for a plurality of mobile gateway accounts. The monitoring system 170 may monitor operational statuses of relationships between the plurality of mobile gateway accounts and a plurality of associated mailboxes. For example, the monitoring system 170 may obtain an account list of mobile gateway accounts associated with a mobile gateway. Additionally, a monitoring system 170 may provide a centralized monitoring architecture for monitoring mobile gateway accounts distributed among a plurality of mobile gateways. In one embodiment, the monitoring system 170 collects and stores error information received in error notifications for later retrieval. For example, a monitoring system may receive an administrative request that initiates monitoring of operational status for one or more mobile gateway accounts. Upon receiving the administrative request, the monitoring system may obtain, from a mobile gateway, an account list of mobile gateway accounts. The account list may be a complete list of all mobile gateway accounts, or may be a partial list comprising only the mobile gateway accounts with a specified initialization state (such as those mobile gateway accounts associated with an error condition on the mobile gateway). For those mobile gateway accounts in the obtained account list, the monitoring system may retrieve error information from storage (such as records in a database) associated with each mobile gateway account. For example, the account list may comprise an identifier associated a mobile gateway account, and the monitoring system may retrieve error notifications having an associated mobile gateway account identifier.

In one embodiment, the monitoring system 170 may present the account list and the operational status associated with each of the mobile gateway accounts in the account list. Presentation may be made to a variety of output components, such as a screen, printer, application programming interface (API), or interface that is operable to present a record of an operational status associated with at least a first mobile gateway account. The presentation of the error information may improve the effectiveness of the monitoring system by correlating first mailbox errors with the mobile gateway account status. For example, an administrator using the monitoring system may more easily identify a need to troubleshoot the first mailbox on the messaging server rather than troubleshoot the mobile gateway account on the mobile gateway.

Figure 2:
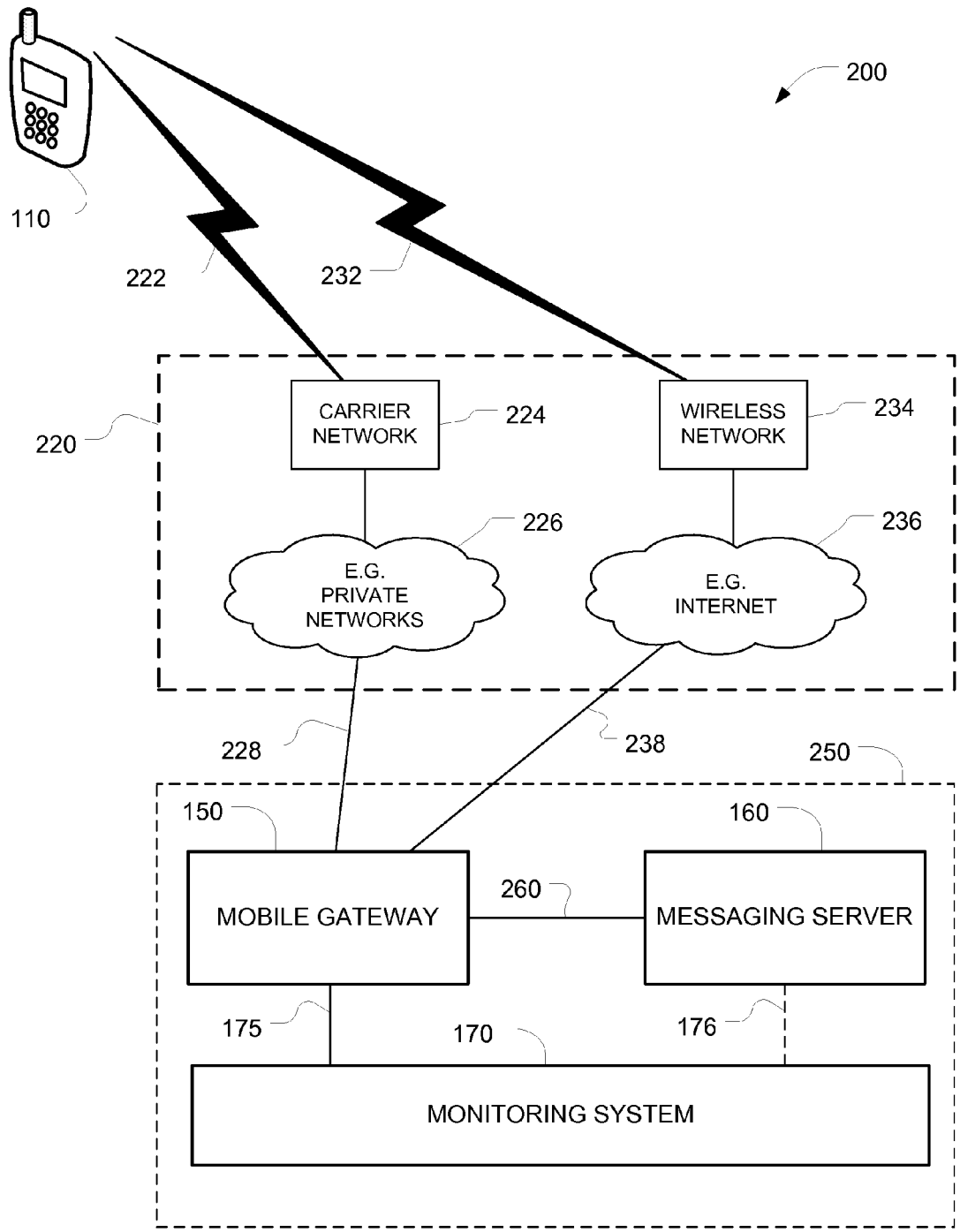
FIG. 2 is a block diagram of another example system in which a mobile device may access a mailbox on a messaging server via a mobile gateway in accordance with at least one embodiment described in this disclosure.

FIG. 2 is an illustration of an example telecommunications system 200 in which embodiments of this disclosure may be used. However, techniques or methods set forth in this disclosure may be applied to other systems or environments. The present application relates to telecommunications systems, including multimedia telecommunications systems, which may be implemented using a variety of technologies, including but not limited to: analog electronic systems; digital electronic systems; microprocessors and other processing elements; and software and otherwise embodied collections of steps, operations, instructions, and the like, for implementing methods, processes, or policies in conjunction with such systems and processing elements. It will be appreciated that in the telecommunications arts, various signal leads, busses, data paths, data structures, channels, buffers, message-passing interfaces, and other communications paths may be used to implement a facility, structure, or method for conveying information or signals, and are often functionally equivalent. Accordingly, unless otherwise noted, references to apparatus or data structures for conveying a signal or information are intended to refer generally to all functionally equivalent apparatus and data structures. The terms "communication link", "link", "interconnected" and "operatively coupled" are intended to refer interchangeably to a connection between components that allows data to pass therebetween, perhaps through one or more intermediate components.

As seen in FIG. 2, a wireless telecommunications system 200 providing a messaging service to mobile devices may comprise first mobile device 110, mobile gateway 150, messaging server 160, and one or more networks 220 coupling the first mobile device 110 to mobile gateway 150. Although only a single mobile device is shown in FIG. 2, embodiments may include a plurality of mobile devices. In some embodiments, the mobile gateway 150 and messaging server 160 may be components in a messaging system 250. Messaging system 250 may, for example, be the internal network of a business or other enterprise, and may provide a variety of network and information services to users associated with that business or enterprise. It will be understood that messaging systems 250 may include additional components (not shown), such as components for providing access to personal computing, information storage, and other applications. Messaging system 250 could also be the network of an Internet Service Provider (ISP) or an Application Service Provider (ASP), which may similarly provide network and information services to external subscribers. Alternatively, messaging system 250 may comprise components that are distributed in multiple networks in communication. In some implementations, the monitoring system 170 may be part of the messaging system 250. The monitoring system 170 may be associated with a single messaging system, such as messaging system 250, or may be configured for monitoring multiple messaging systems (not shown).

The wireless telecommunications system 200 may employ one or more networks 220 providing communication between first mobile device 110 and mobile gateway 150. Network 220 may comprise one or more wireless networks and any additional transport networks to couple such wireless networks to mobile gateway 150. By way of example but not limitation, network 220 may include a first network 224 which may be a telecommunications-carrier-operated public network, such as a GPRS, UMTS, CDMA, or other similar network of any generation or technology, offering data services to public subscribers or users. Network 220 may also include, for example, a wireless network 234 for providing access via, for example, the group of wireless technologies known as WLAN, WiFi or WiLAN. Wireless network 234 may comprise a wireless access point (not shown). Other wireless access technologies could also be used. First mobile device 110 includes equipment compatible with at least one of the networks 224, 234 such that one or more wireless data communications links, such as 222, 232 may be established between the first mobile device 110 and corresponding networks 224, 234.

As is known in the art, networks 224 and 234 may be in communication with messaging system 250 via one or more transport networks 226, 236. Transport networks 226, 236 may be realized using any suitable network technology, including without limitation leased data lines, virtual private networks, the Internet, and the like. For example, carrier network 224 may be connected to messaging system 250 via leased lines or other private, dedicated, or non-shared facilities. For another example, WiFi access point 234 may be connected to messaging system 250 via the public Internet. The transport networks 226, 236 may provide communications to or from mobile gateway 150 via any suitable links 228, 238.

Figure 3:
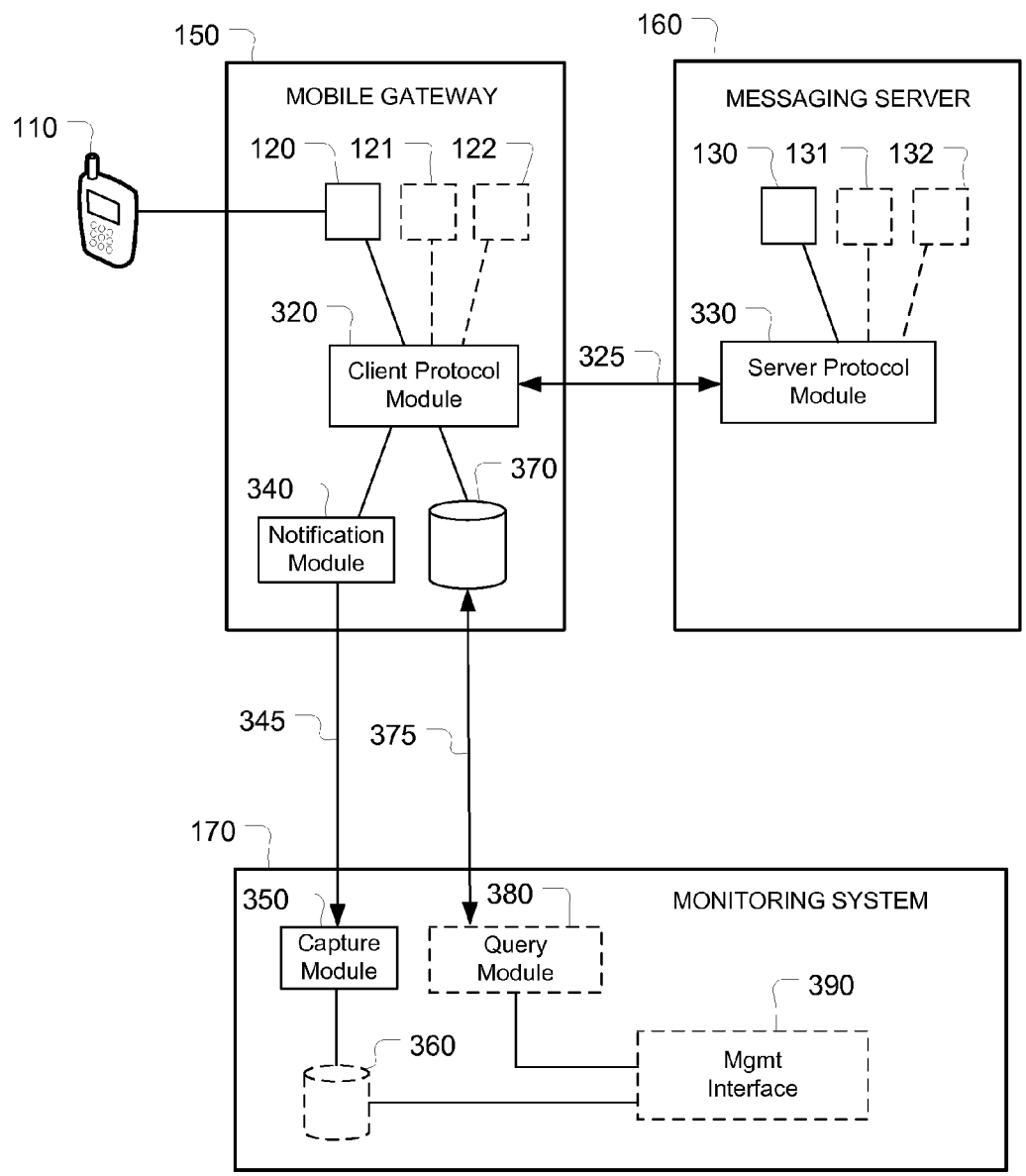
FIG. 3 is a block diagram illustrating an example monitoring system for monitoring an operational status of a relationship between a mobile gateway account and an associated mailbox in accordance with at least one embodiment described in this disclosure.

FIG. 3 depicts another block diagram of elements of the example system 100 of FIG. 1. First mobile device 110 is associated with first gateway account 120, and first gateway account 120 has a configured relationship to first mailbox 130. The first gateway account 120 (or settings associated with first gateway account 120) may be stored in an account database or other storage available on or otherwise associated with the mobile gateway 150, such as gateway account database 370. In FIG. 3, the mobile gateway 150 may comprise a client protocol module 320 that is in communication with server protocol module 330 on the messaging server 160. In accordance with the configuration of first gateway account 120, client protocol module 320 may access first mailbox 130 on behalf of first mobile device 110.

The client protocol module 320 and server protocol module 330 interact using a mailbox protocol 325 (such as MAPI, IMAP, POP, OWA, XML, HTTP, HTTPS, EWS, SOAP, etc.). Mailbox protocol 325 may be any protocol that may be used to access each mailbox, such as first mailbox 130, on the messaging server 160. As previously described, a mailbox may be a traditional email account, mail account, messaging account, social media account, instant messaging account, or any account (also referred to as a user account, subscription, profile, or user identity) that is associated with a bundle of communications directed to or from the account. Therefore, other protocols used to access various types of mailboxes may be associated with mailbox protocol 325, for example (without limitation): Open System for CommunicAtion in Realtime (OSCAR), Trillian, ICQ, Skype protocol, Session Initiation Protocol (SIP), Internet Relay Chat (IRC), Jabber, Extensible Messaging and Presence Protocol (XMPP), or any other protocols associated with accessing a messaging account (mailbox) on a messaging server.

Additionally, the mailbox protocol 325 may comprise signaling that enables the messaging server 160 to notify the mobile gateway 150 of a new email message. Alternatively, the mobile gateway 150 may utilize the mailbox protocol 325 to access the first mailbox 130 to periodically exchange, transmit, or synchronize messages between first mailbox 130 and a counterpart mobile mailbox (not shown) on first mobile device 110.

In one example, with reference to FIG. 3, the client protocol module 320 communicates using mailbox protocol 325 with the server protocol module 330 to obtain access to first mailbox 130. Typically, there may be three possible results of the attempt to obtain access to first mailbox 130. In a first result, the connection is successful, and client protocol module 320 is able to access first mailbox 130 without encountering any mailbox errors. In a second result, the connection attempt times-out, or does not complete due to a lack of response from the server protocol module 330. The mobile gateway 150 may treat this second result as a temporary problem, or may report the lack of response to monitoring system 170. In the third result, the connection fails due to a mailbox error in the first mailbox 130. Typically, the presence of a mailbox error in the first mailbox 130 will result in a mailbox protocol error message from the server protocol module 330 to the client protocol module 320.

When the client protocol module 320 detects an error associated with first mailbox 130, the error is shared, transmitted, or otherwise communicated to a notification module 340. The notification module 340 may create or generate the error notification and provide that error notification to the monitoring system 170. For example, the notification module 340 may send a User Datagram Protocol (UDP) one-way notification message to the monitoring system 170. In one implementation, the error notification may comprise a Simple Network Management Protocol (SNMP) trap message. In other implementations, error notifications may comprise any message transmitted from the mobile gateway 150 to the monitoring system 170. Alternatively, the error notification may be logged in a storage in the mobile gateway 150 in such a way that the monitoring system may retrieve the error notifications according to common monitoring protocols (such as SNMP polling, log file retrieval, etc). Although FIG. 3 depicts the notification module 340 as being part of the mobile gateway 150, the notification module 340 may be a component of the messaging server 160, or components of both the mobile gateway 150 and the messaging server 160. For example, the server protocol module 330 may detect an error associated with the first mailbox 130 based on a mailbox protocol error message and may initiate an error notification to the monitoring system 170. If the messaging server 160 causes the error notification to be sent to the monitoring system, the error notification may comprise a mailbox identifier that is related to a mobile gateway account identifier.

As described previously, an attempt to access first mailbox 130 may result in a successful connection, or in a timeout, both of which may also be communicated to the notification module. The notification module 340 may communicate other notifications (in addition to the error notifications) to the monitoring system 170 as a result of successful connections, timeouts, or other notifications sent from the mobile gateway 150.

Monitoring system 170 may comprise various components, such as capture module 350, query module 380, error database 360, and management interface 390. Capture module 350 may receive error notifications from the notification module 340 of the mobile gateway 150. Alternatively, capture module 350 may receive error notifications from other sources, including messaging server 160 or first mobile device 110. The capture module 350 may process the error notifications and optionally store error information in the error database 360. For example, the capture module 350 may store an error indicator and mobile gateway account identifier retrieved from the error notification in the error database 360 for subsequent retrieval.

The query module 380 may provide access to an account list identifying mobile gateway accounts on the mobile gateway 150. For example, the query module 380 may communicate a query message to the mobile gateway 150 to request an account list, and receive a response message from the mobile gateway comprising the account list. The query module 380 may interact directly with a gateway account database 370 in the mobile gateway 150, or may receive an account list through an intermediary component. For example, the query module 380 may interact with an administrative server (not shown) that has access to mobile gateway account settings associated with mobile gateway accounts on the mobile gateway 150.

In this disclosure, an account list identifies at least a first gateway account configured on a mobile gateway. The account list may comprise a mobile gateway account identifier, initialization state of the mobile gateway account on the mobile gateway, or other information associated with mobile gateway accounts. The account list may identify one or many mobile gateway accounts, and may represent a complete listing or partial listing of mobile gateway accounts on the mobile gateway. For example, query module 380 may request an account list from mobile gateway 150, requesting only mobile gateway account identifiers for mobile gateway accounts that are in an error condition on the mobile gateway.

Also depicted as a part of monitoring system 170 is a management interface 390. The management interface 390 may be an output component, such as a screen, printer, application programming interface (API), or interface that is operable to present a record of an operational status associated with at least a first gateway account. The management interface 390 may present information, in part or in whole, associated with an account list obtained by the query module 380, as well as error information obtained by the capture module 350. For example, the management interface 390 may present an account list showing those mobile gateway accounts that are in an error condition on the mobile gateway, as well as error information retrieved from the error database 360. The error information may be associated with error notifications that indicate mailbox errors. The management interface 390 may present the collected information in such a way that the account list provides an operational status associated with the mobile gateway account, including mobile gateway account status (e.g. initialization state of the mobile gateway account on the mobile gateway) and any error information suggesting mailbox status (based on mailbox protocol errors).

It will be understood that the monitoring system 170 may combine information from multiple sources when presenting the record of the operational status of a relationship between a mobile gateway account and a mailbox. As described, the monitoring system 170 may combine aspects of an account list identifying mobile gateway accounts with error information stored in relation to mobile gateway account identifiers. Additionally, the monitoring system 170 may combine information obtained from SNMP polling, database queries, or other notifications to present the record of the operational status associated with one or more mobile gateway accounts. For example, the error notifications or other notifications may include an identifier that enables the monitoring system 170 to relate the notification to a mobile gateway account. In some implementations, the monitoring system 170 may perform one or more steps to translate an identifier in an error notification into a mobile gateway account identifier. Translation might include, for example, looking up an email address associated with a mailbox identifier in an error notification, and using the email address to lookup the associated mobile gateway account. Other translations or combinations of lookups might be used to relate error notifications to a specific mobile gateway account.

Figure 4:
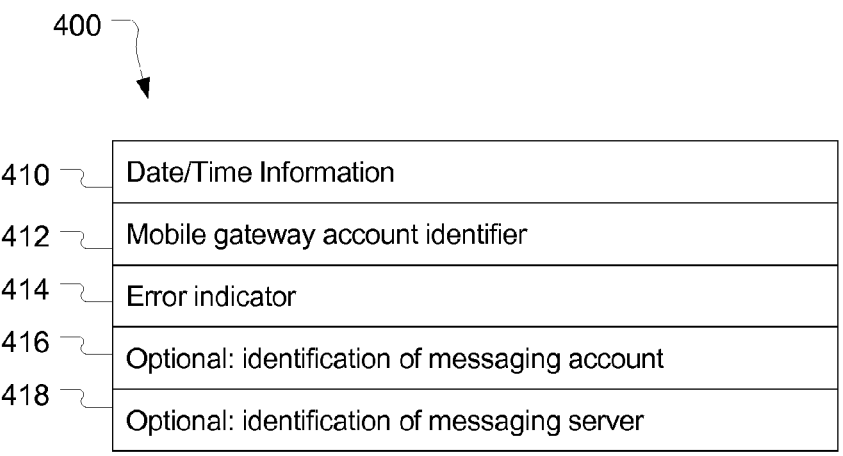
FIG. 4 is an example error notification in accordance with at least one embodiment described in this disclosure.

FIG. 4 illustrates an error notification 400 according to at least one embodiment of the present disclosure, such as an error notification sent from a mobile gateway to a monitoring system. It will be understood that this is an example error notification, and that modifications, including additions and subtractions, to the content of an error notification may be made without departing from the scope of the present disclosure. The error notification 400 comprises a portion to indicate date and/or time information 410, such as the date/time when a mailbox protocol error was encountered. The error notification 400 also comprises a mobile gateway account identifier 412 that identifies a mobile gateway account configured on the mobile gateway. An error indicator 414 is included in the error notification 400. The error indicator 414 may comprise an error code, number, or text, or may be a representation of the error.

The error notification 400 may comprise an identification of a mailbox 416 on the messaging server. If the messaging system comprises more than one messaging server, the error notification 400 may comprise an identification of the messaging server 418 associated with the mailbox error. If the messaging system comprises more than one mobile gateway, the error notification 400 may also comprise an identification of the mobile gateway (not shown). Any portion of additional information, if included in the error notification, may be utilized by the monitoring system when presenting error information associated with a mobile gateway account.

Figure 5:
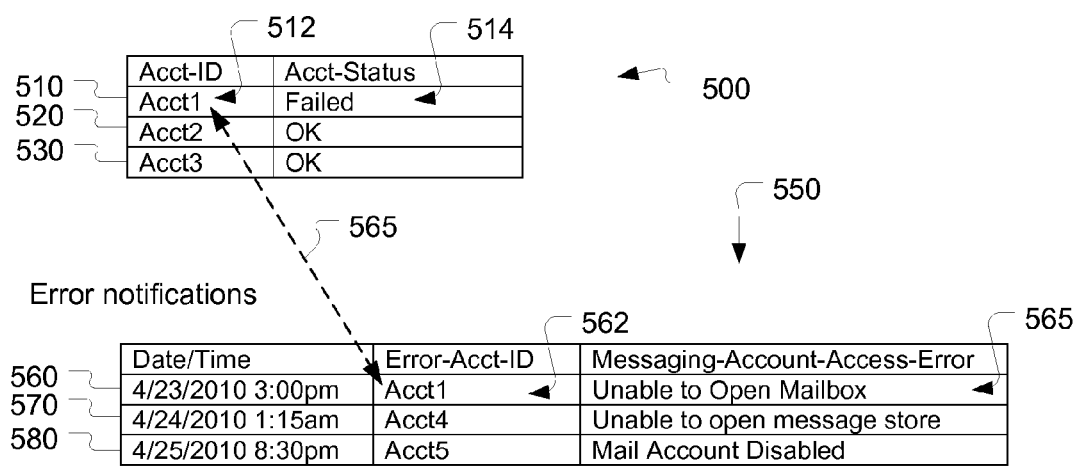
FIG. 5 is an illustration depicting example data which may be used to monitor an operational status of a mobile data service in accordance with at least one embodiment described in this disclosure.

FIG. 5 is a depiction of an example data structure associated with an example account list 500 and example data structure associated with error notifications 550 that may be used by a monitoring system in accordance with at least one embodiment of the present disclosure. The example account list 500 comprises a list of mobile gateway accounts configured on a mobile gateway. A first item 510 in the account list identifies a first gateway account. In this example, the first item 510 comprises a first gateway account identifier 512 (the unique identifier represented by the text "Acct1") and a first gateway account status 514. First gateway account status 514 indicates that the first gateway account is in a "Failed" initialization state, also referred to as an error condition on the mobile gateway, un-initialized, deactivated, or other terms to indicate that the mobile gateway account is not operating correctly. The second item 520 in the example account list 500 represents a second gateway account ("Acct2") that is in a success condition ("OK"), or successful initialization state, on the mobile gateway. Similar to the second item 520, the third item 530 represents a third gateway account ("Acct3") that has a third gateway account status of "OK."

The example error notifications 550 are illustrative of error notifications that may be received at the monitoring system. Although depicted in table form, each error notification 560, 570, 580 may be received at different times. In some embodiments, the monitoring server may collect error notifications and store error information in a memory, such as error database 360, of the monitoring server. The first error notification 560 includes a date/time field, an identifier 562 of a mobile gateway account (indicating "Acct1" as the mobile gateway account identifier), and an error indicator 564 (represented by the text "Unable to Open Mailbox" in this example). A second error notification 570 is associated with "Acct4" (an identifier of a fourth mobile gateway account configured on the mobile gateway) with mailbox error (represented by the text "Unable to open message store"). A third error notification 580 is associated with "Acct5" (an identifier of a fifth mobile gateway account configured on the mobile gateway) with mailbox error (represented by the text "Mail Account Disabled").

Many types of mailbox errors may be used in various embodiments of the present disclosure. Many of these are derived from mailbox protocol error messages, or may be textual descriptions of error indicators in mailbox protocol error messages. Several examples of mailbox errors may include, without limitation:

Could not create MAPI filter
Could not create profile
Could not enable notifications
Could not open mailbox database
Mail Account Disabled
Mailbox corrupt
Unable to open mailbox
Unable to open message store It should be understood that these mailbox errors are shown for clarity in English text, but mailbox errors may be represented in a mailbox protocol error message using error codes (e.g. numeric or textual short codes representing the error) as is known in the art.

As described in FIG. 3, the mobile gateway 150 may also send other notifications related to mobile gateway account errors. These may be local errors not specific to a mailbox error, including (but not limited to): Could not create threadpool, Could not create usercontrol object, MailboxDN is empty, ServerDN is empty, Unknown reason, User is being deleted, User is shutting down. These mobile gateway errors may be combined at the monitoring system 170 with the error notifications (if any) when presenting the operational status associated with a mobile gateway account.

When monitoring a mobile gateway account, the monitoring system may collect error notifications and match them with corresponding mobile gateway account indicators in an account list. For example, the monitoring system may obtain the example account list 500 identifying gateway accounts configured on a mobile gateway. Based on the "Failed" initialization state (in first gateway account status 514) associated with the first gateway account identifier 512, the monitoring server may determine that the initialization state of the first gateway account status is in an error condition. The monitoring system may retrieve error information from a memory, such as error database 360, to identify any mailbox errors associated with the first gateway account. For example, the monitoring system may retrieve the first error notification 560 based on a match (represented by double headed arrow 565) between the first gateway account identifier 512 ("Acct1") and the error notification having the same identifier 562 ("Acct1"). The monitoring system may present a status of the first gateway account based on first gateway account status 514 ("Failed" operational state of the first gateway account on the mobile gateway) and first mailbox status, represented by error indicator 564 ("Unable to Open Mailbox" error in the first mailbox on messaging server).

If multiple error notifications, which are received, are associated with a mobile gateway account, the monitoring system may present error information for the multiple error notifications, or may present only error information associated with the most recently received error notification associated with the mobile gateway account. Alternatively, the monitoring system may present error information in order of priority or severity. For example, if an error notification indicates a mailbox error and it is the most likely cause of the failed operational state (compared to other error notifications), the mailbox error information may represent a higher priority for presentation. Other ways to present error information associated with multiple error notifications will be readily apparent to one of skill in the art, such as combining notifications, prioritizing notifications, consolidating error information, or other ways of presenting multiple data items related to error notifications.

Figure 6:
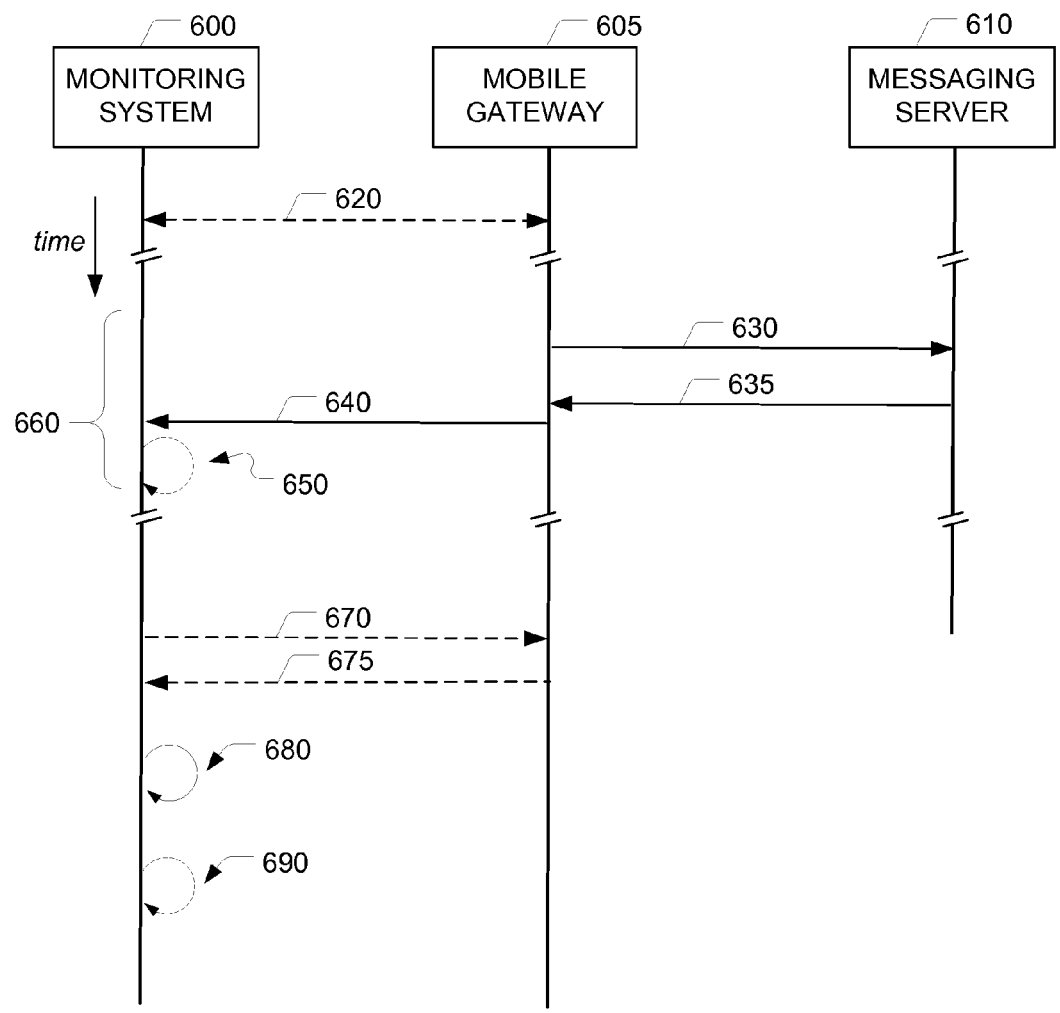
FIG. 6 is an example message flow diagram in accordance with at least one embodiment described in this disclosure.

FIG. 6 depicts an example message/process flow associated with at least one embodiment described in this disclosure. A monitoring system 600 in FIG. 6 may operate similarly to the monitoring system 170 previously described in relation to FIGS. 1-3. In addition, mobile gateway 605 and messaging server 610 may operate similarly to mobile gateway 150 and messaging server 160, respectively. At an initial portion of the message/process flow diagram, a process may occur at 620 to associate the monitoring system 600 and the mobile gateway 605. For example, this association may include configuration of one or both of these components to establish a monitoring link or relationship between the two components. Furthermore, at 620, an account list may be obtained at monitoring system 600 from mobile gateway 605 to indicate which mobile gateway accounts are configured for monitoring. It will be understood that the example process need not entail an initial association at 620 between the monitoring system 600 having and mobile gateway 605. For example, the monitoring system 600 may be a monitoring system that is configured to listen to substantially all incoming messages and catalog the incoming message in a memory store of the monitoring system. Alternatively, at 620, the mobile gateway 605 may be configured to send error notifications to the monitoring system 600, such as enabling an SNMP trap process, identifying the network address of the monitoring system 600, or other processes to initiate monitoring of at least one mobile gateway account on the mobile gateway 605.

At 630, mobile gateway 605 attempts to access a first mailbox on messaging server 610. Specifically, the mobile gateway 605 may utilize a mailbox protocol such as those previously described to obtain access to message items in the first mailbox. The first mailbox is associated with a first gateway account on the mobile gateway 605, such that the first gateway account is configured with a parameter identifying the first mailbox. At 635, the messaging server 610 communicates information to the mobile gateway 605. More particularly, the mobile gateway 605 receives, from the messaging server 610, an indication of a mailbox error. For example, arrow 635 may be indicative of a mailbox protocol error message or other error message that indicates a problem that is specific to the first mailbox on the messaging system. Responsive to receiving the indication of the mailbox error, mobile gateway 605 sends an error notification to the monitoring system 600, as indicated by arrow 640. The error notification may comprise an identifier of the first gateway account and the indication of the mailbox error. The error notification may include an error indication as it was received in the mailbox protocol error message. Alternatively, the error notification may include error information relative to the error indication that is generated by the mobile gateway based on the error indication in the mailbox protocol error message.

At 640, the monitoring system 600 receives an error notification from the mobile gateway 605. At 650, the monitoring system 600 may process the error notification. For example, the monitoring system 600 may translate a portion of the error notification into a mailbox status. Optionally, the monitoring system 600 may store a portion of the error notification or a generated mailbox status based on the error notification in a memory of the monitoring system 600. In one embodiment, the error indication is stored in the memory along with the identifier of the first gateway account. In some monitoring systems, the processing 650 may not occur in a "near real-time" or "real-time" fashion, but may occur subsequently. The processes identified by 630, 635, 640, and 650 may be grouped as indicated by reference number 660. Furthermore, this grouped process 660 may occur more than once. For example, grouped process 660 may occur for each mobile gateway account of a plurality of mobile gateway accounts.

Arrows 670 and 675 represent a process which may be used by the monitoring system to obtain an account list identifying a plurality of mobile gateway accounts on the mobile gateway 605. This process includes operations 670, 675 which may occur at any time, before or after, the grouped error notification process 660. It will also be understood that arrows 670 and 675 may be omitted when there are other ways for the monitoring system 600 to obtain an account list, such as manual entry, receiving the account list from another machine, or retrieving the account list from a memory in the monitoring system. In one example, the monitoring system 600 receives a status request (for example, from an administrator) for a list of mobile gateway accounts that are in an error condition on the mobile gateway 605. In response to receiving the status request, the monitoring system 600 may obtain the account list 670, 675 to provide a more accurate list of current mobile gateway accounts in an error condition. At 670, the monitoring system 600 sends a query message to the mobile gateway 605 to request the account list. At 675, the monitoring system 600 receives a response message from the mobile gateway 605 having the account list. As described previously, the account list may be a full list, partial list, or subset of mobile gateway accounts on the mobile gateway.

At 680, the monitoring system 600 presents a record of an operational status of a relationship between the first gateway account on the mobile gateway and the first mailbox on the messaging server. For example, the monitoring system 600 may output on a visual display, printer, electronic message, or other output device, an identifier of the first gateway account and the error indication. At 690, the monitoring system 600 may also present a portion of the account list along with a mailbox status for the mobile gateway accounts included in the account list. For example, the monitoring system 600 may output a partial listing of mobile gateway accounts that are in an error condition on the mobile gateway and associated with each mobile gateway account, respective mailbox errors having been detected by the mobile gateway for each such mobile gateway account.

Figure 7:
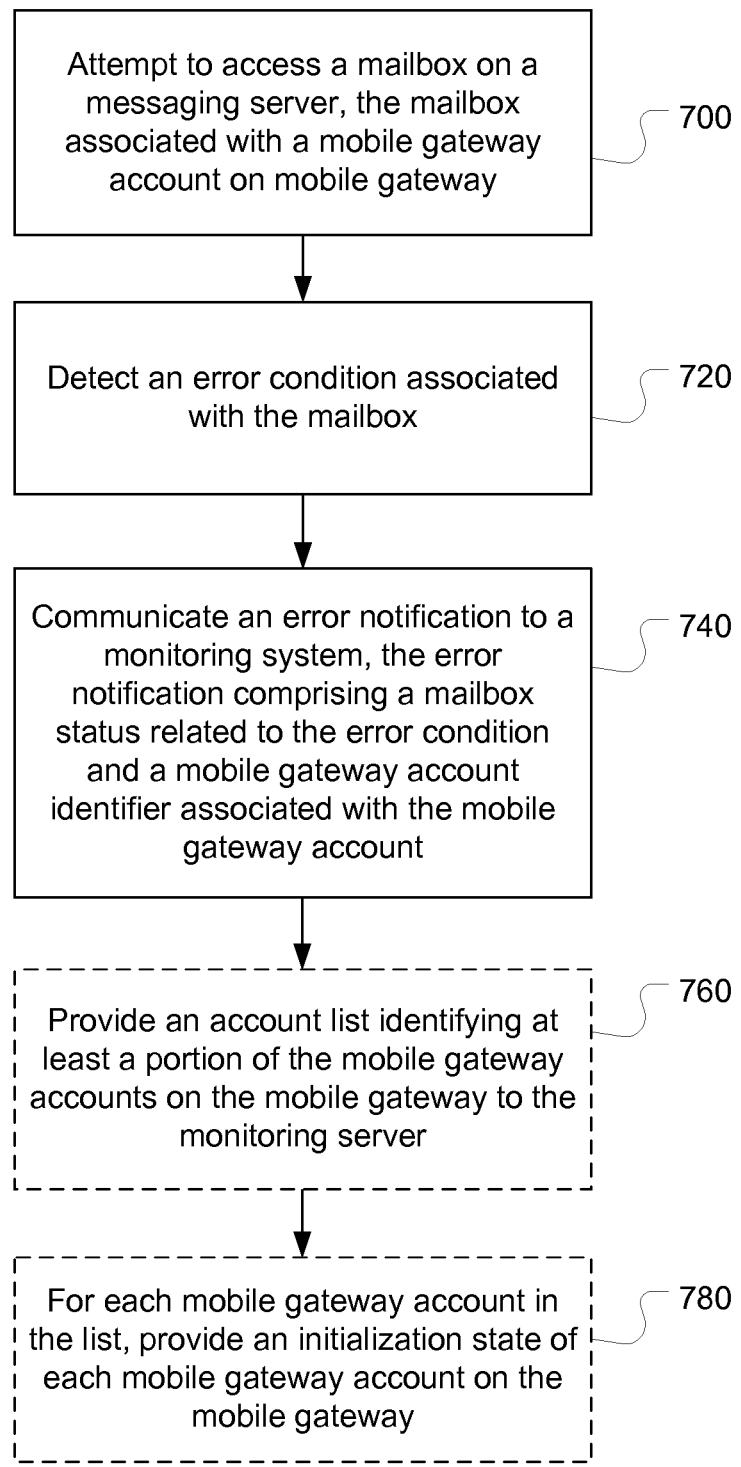
FIG. 7 is a flowchart of an example method in a mobile gateway in accordance with at least one embodiment described in this disclosure.

FIG. 7 is a flowchart depicting an example method for use in a mobile gateway in accordance with at least one embodiment described in this disclosure. The mobile gateway has a relationship to a mailbox on a messaging server as specified by mobile gateway account settings on the mobile gateway. At block 700, the mobile gateway attempts to access a mailbox on a messaging server, the mailbox associated with the mobile gateway account on mobile gateway. At block 720, the mobile gateway detects an error condition associated with the mailbox. For example, the mobile gateway may receive a mailbox protocol error message with an error indicator. The error indicator may be similar to those described elsewhere in this disclosure. At block 740, the mobile gateway communicates an error notification to a monitoring system, the error notification comprising a mailbox status related to the error condition and a mobile gateway account identifier associated with the mobile gateway account. For example, the mailbox status may be the error indicator received in the mailbox protocol error message. Alternatively, the mailbox status may be an error text generated by the mobile gateway that is related to the error indicator received in the mailbox protocol error message.

In some implementations, the mobile gateway may provide an account list of mobile gateway accounts configured on the mobile gateway. For example, the account list may include at least a portion of the mobile gateway accounts on the mobile gateway. At block 760, the mobile gateway may provide an account list to the monitoring server. Optionally, the mobile gateway may provide an initialization state of each mobile gateway account in the account list, at block 780.

Figure 8:
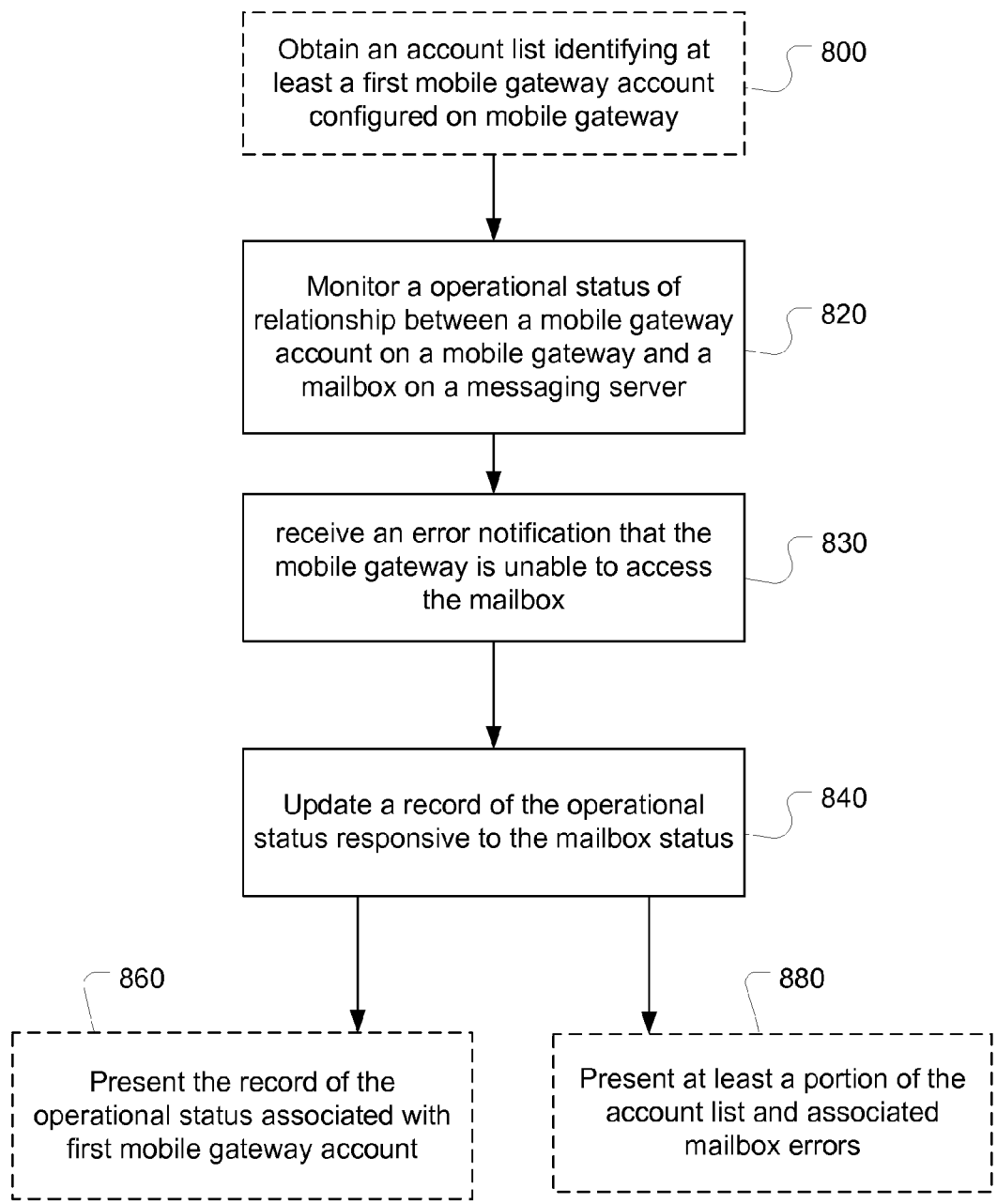
FIG. 8 is a flowchart of an example method in a monitoring system in accordance with at least one embodiment described in this disclosure.

FIG. 8 is a flowchart depicting an example method for use in a monitoring system in accordance with at least one embodiment described in this disclosure. At block 800, the monitoring server may obtain an account list identifying at least a first gateway account configured on a mobile gateway. As stated in relation to FIG. 6, this action is optional, and may occur before or after any other actions, or may not occur at all in some implementations. The account list may be obtained directly from the mobile gateway, such as through a query message and response message, or the account list may be obtained through an intermediary system. Alternatively, the account list may be obtained by an input portion of the monitoring system, such as by manual entry of an administrator.

At block 820, the monitoring system monitors an operational status of relationship between a mobile gateway account on a mobile gateway and a mailbox on a messaging server. At block 830, the monitoring system receives an error notification that the mobile gateway is unable to access the mailbox. In one example, the error notification is received from the mobile gateway. Responsive to the error notification, the monitoring system updates a record of the operational status at block 840. For example, the monitoring system may update a portion of memory for storing the operational status associated with each mobile gateway account. The monitoring system may append a status indicator associated with the mobile gateway account to indicate a mailbox error identified in the error notification.

At block 860, the monitoring system may present the record of the operational status associated with the mobile gateway account. For example, this may be a screen display showing details about the mobile gateway account, in which error information about the mailbox error is displayed. Alternatively, at block 880, the monitoring system may present at least a portion of the account list and any associated mailbox errors identified in the error notifications.

Figure 9:
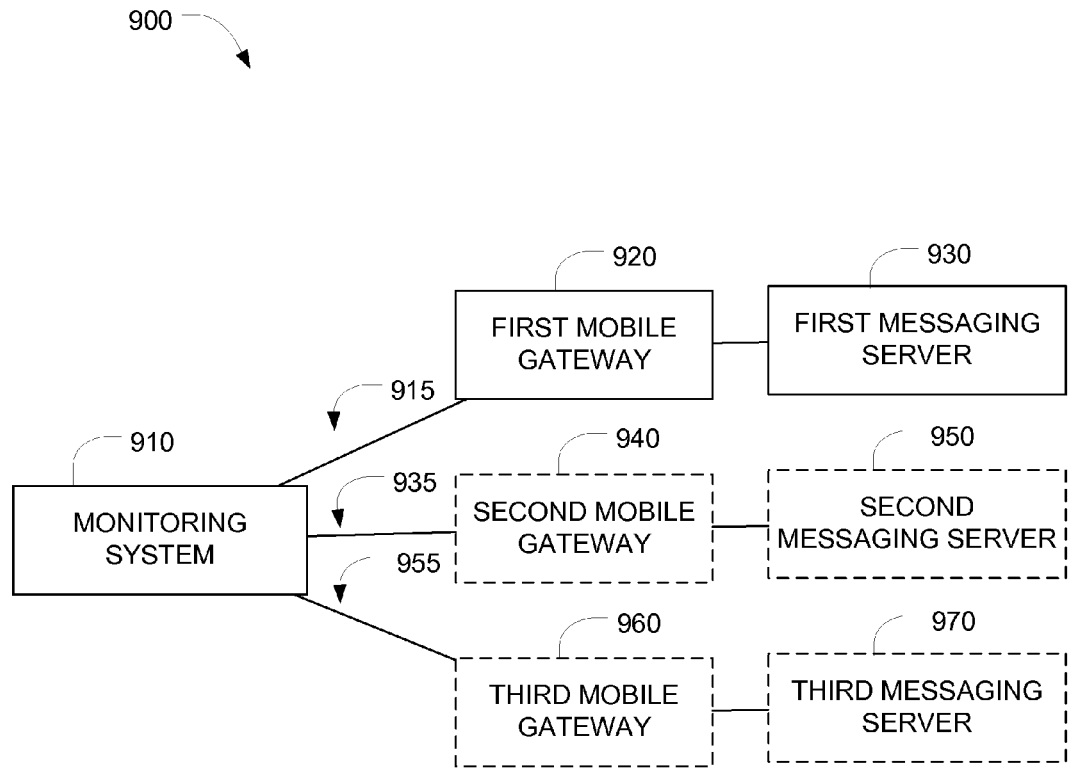
FIG. 9 is a diagram depicting another example system in which at least one embodiment described in the present disclosure may be used.

FIG. 9 shows an example messaging system 900 in which a monitoring system 910 may monitor statuses of a plurality of mobile gateway accounts. As shown, each mobile gateway account may establish a relationship between various mobile gateways and various messaging servers. That is, the mobile gateway accounts of the plurality may be distributed across multiple mobile gateways. As shown, the mobile gateway accounts relate mobile gateways, such as first mobile gateway 920, second mobile gateway 940, and third mobile gateway 960 with first messaging server 930, second messaging server 950, and third messaging server 970 respectively. The monitoring system 910 may receive error notifications via a reporting communication link 915, 935, 955 from mobile gateways 920, 940, 960, respectively. First mobile gateway 920 may be associated with one or more messaging servers, such as first messaging server 930. First mobile gateway 920 is considered associated with first messaging server 930 if it has at least one mobile gateway account configured on first mobile gateway 920 that is related to a first mailbox on first messaging server 930. If an appropriately associative mobile gateway account is present, second mobile gateway 940 may access mailboxes on second messaging server 950. Similarly, if another appropriately associative mobile gateway account is present, third mobile gateway 960 may access mailboxes on third messaging server 970.

The monitoring system 910 in FIG. 9 may provide mobile gateway account monitoring in a distributed messaging system 900. For example, a centralized monitoring system 910 might provide account-level status for mobile gateway accounts and associated mailbox status. An administrator may use the centralized monitoring system 910 to determine if failed mobile gateway accounts are in an error condition due to mailbox errors or mobile gateway account errors on the mobile gateway. Without a centralized monitoring system 910, the administrator may have additional steps to determine the correct mobile gateway for a mobile gateway account. Furthermore, the administrator may perform additional steps to determine the mobile gateway account status on the correct mobile gateway. Moreover, the administrator may perform additional steps to determine whether the error condition is associated with mailbox protocol errors or other error indicators associated with the mailbox on a messaging server.

Through an implementation of at least one embodiment of the present disclosure, the administrator may be presented with some or all of an account list along with mobile gateway account status and any mailbox errors known by monitoring system 910 to be associated with failed mobile gateway accounts.

Figure 10:
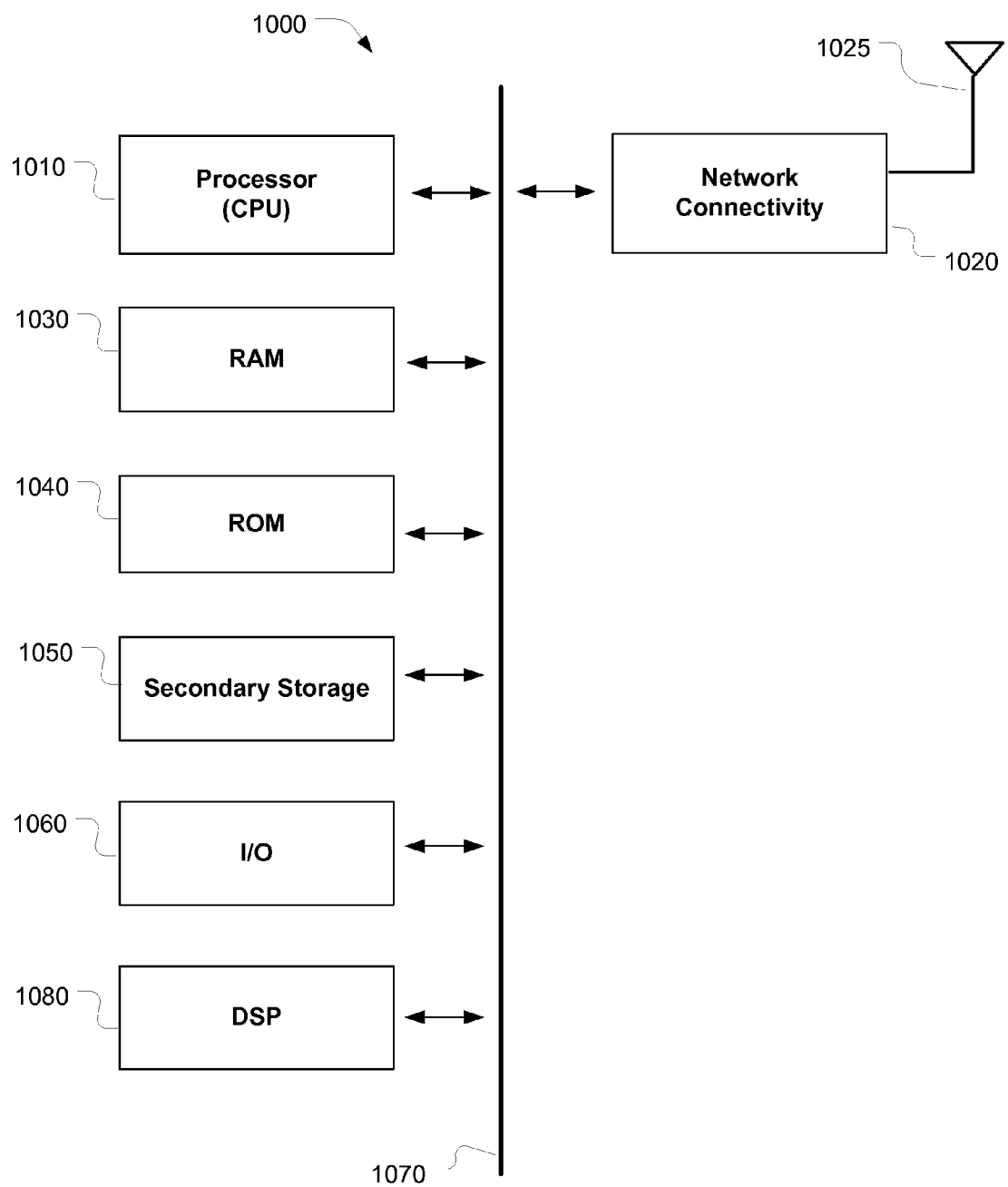
FIG. 10 is a diagram illustrating a processor and related components suitable for implementing at least one embodiment described in the present disclosure.

FIG. 10 illustrates an example embodiment of an apparatus 1000 that may be configured to operate as a device (e.g., mobile devices 110, 111, 112, mobile gateway 150, messaging server 160, and monitoring system 170) which includes a processing component 1010 suitable for implementing one or more of the embodiments earlier described herein. In addition to the processor 1010 (which may be referred to as a central processor unit or CPU), the apparatus 1000 may include network connectivity devices 1020, random access memory (RAM) 1030, read only memory (ROM) 1040, secondary storage 1050, and input/output (I/O) devices 1060. These components may communicate with one another via a bus 1070. In some cases, some of these components may not be present or may be combined in various combinations with one another or with other components not shown. These components may be located in a single physical entity or in more than one physical entity. Any actions described herein as being taken by the processor 1010 might be taken by the processor 1010 alone or by the processor 1010 in conjunction with one or more components shown or not shown in the drawing, such as a digital signal processor (DSP) 1080. Although the DSP 1080 is shown as a separate component, the DSP 1080 may be incorporated into the processor 1010.

The processor 1010 executes instructions, logic, codes, computer programs, or scripts that it may access from the network connectivity devices 1020, RAM 1030, ROM 1040, or secondary storage 1050 (which might include various disk-based systems such as hard disk, floppy disk, or optical disk). In one embodiment, a computer readable medium may store computer readable instructions, which when executed by the processor 1010, cause the processor to perform according to a method described in this disclosure. While only one CPU 1010 is shown, multiple processors may be present. Thus, while instructions may be discussed as being executed by a processor, the instructions may be executed simultaneously, serially, or otherwise by one or multiple processors. The processor 1010 may, for example, be implemented as one or more CPU chips or modules. The processor 1010 may also be integrated with other functions of a device (e.g., first mobile device 110, mobile gateway 150, messaging server 160, and monitoring system 170) in or on a single chip or module.

The network connectivity devices 1020 may take the form of any component enabling communication via a network, such as those used for local area network devices, wireless network devices, personal area network devices, radio transceiver devices, and/or other well-known devices for connecting to networks. The network connectivity devices 1020 might also include one or more transceiver components 1025 capable of transmitting and/or receiving data wirelessly, including devices embodying or implementing any of the following wireless network technologies (without limitation): code division multiple access (CDMA), global system for mobile communications (GSM), worldwide interoperability for microwave access (WiMAX), etc.

The RAM 1030 might be used to store volatile data and perhaps to store instructions that are executed by the processor 1010. The ROM 1040 is a non-volatile memory device that in some cases has a smaller memory capacity than the memory capacity of the secondary storage 1050. ROM 1040 might be used to store instructions and perhaps data that are read during execution of the instructions. Access to both RAM 1030 and ROM 1040 is typically faster than to secondary storage 1050. The secondary storage 1050 is typically comprised of one or more disk drives or tape drives and might be used for non-volatile storage of data or as an over-flow data storage device if RAM 1030 is not large enough to hold all working data. However, the secondary storage 1050 could be implemented using any appropriate storage technology, including so-called "solid state disk," FLASH, EEPROM, or other generally non-volatile or persistent storage. Secondary storage 1050 may be used to store programs that are loaded into RAM 1030 when such programs are selected for execution. In addition to storing instructions that are executed by the processor 1010, RAM 1030 or secondary storage 1050 may be used to store mailboxes, gateway account database, error database, error information, account list of mobile gateway accounts, or other elements described in this disclosure associated with memory of a device.

The I/O devices 1060 may include liquid crystal displays (LCDs), touch screen displays, keyboards, keypads, switches, dials, mice, track balls, voice recognizers, card readers, paper tape readers, printers, video monitors, or other well-known input devices. Also, the transceiver 1025 might be considered to be a component of the I/O devices 1060 instead of or in addition to being a component of the network connectivity devices 1020. Some or all of the I/O devices 1060 may be substantially similar to various components described in the previously figures, such as the management interface 290 of FIG. 3.

This disclosure describes a method, comprising: monitoring an operational status of a relationship between a mobile gateway account on a mobile gateway and a mailbox on a messaging server; receiving an error notification that the mobile gateway is unable to access the mailbox, the error notification identifying a mailbox error; and updating a record of the operational status responsive to the mailbox error.

As apparent to one of skill in the relevant arts, this method may be expanded to monitor more than a single mobile gateway account. For example, the method may further comprise: monitoring a second operational status of a second relationship between a second mobile gateway account on the mobile gateway and a second mailbox; receiving a second error notification that the mobile gateway is unable to access the second mailbox, the second error notification identifying a second mailbox status; and updating the record of the second operational status responsive to the second mailbox status.

The method may further comprise receiving a plurality of error notifications, each error notification comprising a mobile gateway account identifier and a related mailbox status of a related mailbox associated with the mobile gateway account identifier. The method may further comprise: upon receiving each error notification, storing error information in a memory of the monitoring system, the error information comprising the related mobile gateway account identifier and the related mailbox status. The method may further comprise: when the related initialization state of the related mobile gateway account is in a failed condition, retrieving the error information comprising the related mobile gateway account identifier from the memory of the monitoring system.

In addition to the methods described herein, this disclosure provides a mobile gateway comprising a computer configured to implement the methods associated with a mobile gateway. This disclosure also provides a monitoring system comprising a computer configured to implement the methods associated with a monitoring system.

The steps or operations described herein are examples. There may be many variations to these steps or operations without departing from the scope of this disclosure. For instance, where appropriate, the steps may be performed in a differing order, or steps may be added, deleted, or modified. Although example embodiments of this disclosure have been depicted and described in detail herein, it will be apparent to those skilled in the relevant art that various modifications, additions, substitutions, and the like can be made without departing from the concepts and embodiments disclosed herein, and these are therefore considered to be within the scope of the present subject matter as defined in the following claims.

What is claimed is:

1. A method, comprising:
monitoring an operational status of a relationship between a mobile gateway account on a mobile gateway and a mailbox on a messaging server;
receiving notification of an attempt of the mobile gateway to synchronize the mobile gateway account with the mailbox in response to an account update, the notification identifying a mailbox error, the notification including a mobile gateway account identifier and comprising a Simple Network Management Protocol (SNMP) trap message; and
updating a record of an initialization state of the mobile gateway account associated with the operational status responsive to the mailbox error.

2. The method of claim 1, wherein the mailbox error is detected by the mobile gateway based on a mailbox protocol error message.

3. The method of claim 1, wherein the notification is received from the mobile gateway.

4. The method of claim 1, further comprising:
presenting the record of the operational status and information associated with the mailbox error.

5. The method of claim 1, further comprising:
receiving a subsequent notification indicating that the mailbox error has abated; and
updating the record of the operational status to indicate that the relationship between the mobile gateway account and the mailbox is in a success condition.

6. The method of claim 1, further comprising:
obtaining an account list comprising mobile gateway account identifiers for a plurality of mobile gateway accounts configured on the mobile gateway including at least the mobile gateway account.

7. The method of claim 6, wherein the notification includes a mobile gateway account identifier associated with the mobile gateway account, the method further comprising:
matching the mobile gateway account identifier in the notification with one of the identifiers for the plurality of mobile gateway accounts configured on the mobile gateway; and
presenting at least a portion of the account list with the mailbox error or the success of synchronization related to the matched mobile gateway account identifier.

8. The method of claim 6, wherein the account list includes mobile gateway account identifiers for mobile gateway accounts that have error conditions on the mobile gateway.

9. An apparatus comprising:
a memory comprising a database configured to store an operational status of a relationship between a mobile gateway account on a mobile gateway and a mailbox on a messaging server; and,
a capture module configured to monitor said mobile gateway and receive an error notification of an attempt of the mobile gateway to synchronize with the mailbox in response to an account update, the error notification identifying a mailbox error, the error notification including a mobile gateway account identifier and comprising a Simple Network Management Protocol (SNMP) trap message, said capture module further configured to update a record of an initialization state of the mobile gateway account associated with the operational status stored in said database responsive to the mailbox error.

10. The apparatus of claim 9, further comprising:
a management module configured to present the record of the operational status and information associated with the mailbox error.

11. The apparatus of claim 9, further comprising:
a query module configured to provide access to an account list identifying the mobile gateway account on the mobile gateway.

12. The apparatus of claim 11, wherein said query module provides access to said account list by interacting with an account database in the mobile gateway.

13. The apparatus of claim 9 wherein said capture module updates said record by storing an error indicator and the mobile gateway account identifier retrieved from said notification in said database.

14. A method in a mobile gateway operatively connected to a messaging server, the method comprising:
attempting to synchronize with a mailbox on the messaging server with an associated mobile gateway account on the mobile gateway in response to an account update;
communicating a notification to a monitoring system, upon detecting an error condition of the mailbox resulting from the mobile gateway attempt to synchronize the mobile gateway account with the mailbox, wherein the error notification comprises a mailbox status related to the error condition and a mobile gateway account identifier associated with the mobile gateway account and wherein the error notification comprises a Simple Network Management Protocol (SNMP) trap message; and
updating a record of an initialization state of the mobile gateway account responsive to the mailbox status.

15. The method of claim 14, wherein the notification comprises a User Datagram Protocol (UDP) message.

16. The method of claim 14, wherein the error condition is detected based on receiving a mailbox protocol message of a mailbox protocol.

17. The method of claim 16, wherein the mailbox protocol is a Messaging Application Programming Interface (MAPI) protocol.

18. The method of claim 14, further comprising:
providing an account list comprising a plurality of mobile gateway account identifiers for a plurality of mobile gateway accounts configured on the mobile gateway.

19. A mobile gateway operatively connected to a messaging server, the mobile gateway comprising:
a client protocol module configured to attempt to synchronize a mobile gateway account on the mobile gateway with a mailbox on the messaging server in response to an account update and to share a detection of an initialization state to a notification module indicating a failure of the attempt to synchronize, wherein the mailbox is associated with the mobile gateway account on the mobile gateway; and
the notification module configured to communicate a notification to a monitoring system, wherein the notification comprises information related to the initialization state failure of the attempt to synchronize and a mobile gateway account identifier associated with the mobile gateway account and the notification comprises a Simple Network Management Protocol (SNMP) message.

* * * * *